United States Patent [19]

Morton

[11] 4,423,511
[45] Dec. 27, 1983

[54] UNSTABLE WAVEGUIDE LASER RESONATOR

[75] Inventor: Richard G. Morton, Richland, Wash.

[73] Assignee: Jersey Nuclear-Avco Isotopes, Inc., Bellevue, Wash.

[21] Appl. No.: 254,643

[22] Filed: Apr. 16, 1981

[51] Int. Cl.³ .............................................. H01S 3/08
[52] U.S. Cl. ..................................... 372/95; 372/108; 372/53
[58] Field of Search ...................... 372/66, 53, 95, 108

[56] References Cited

U.S. PATENT DOCUMENTS 3,890,578  6/1975  Wang ..................................... 372/53
4,126,381  11/1978  Chodzko et al. ...................... 372/95

OTHER PUBLICATIONS

"Mode Calculations in Unstable Resonators with Flowing Gain" by Sherman et al.; *Applied Optics* vol. 13, No. 12, Dec. 1974.

Primary Examiner—James W. Davie
Assistant Examiner—Léon Scott, Jr.
Attorney, Agent, or Firm—Weingarten, Schurgin, Gagnebin & Hayes

[57] ABSTRACT

A hybrid laser resonator for use with a transverse flow waveguide laser includes cylindrical optical elements for coupling together regions of a thin slab-shaped laser medium operating in the waveguide mode through a set of reflectors which define the ends of the laser cavity. Separate waveguide cylindrical optics which focus in the thin dimension of the slab are combined with a negative cylindrical lens which diverges in the thick dimension of the slab. The negative lens causes an unstable resonator condition to exist in the thick or fluid flow direction so as to prevent narrow isolated horizontal lasing bands and thus provide a nearly diffraction limited beam quality in both thick and thin dimensions.

16 Claims, 4 Drawing Figures

UNSTABLE WAVEGUIDE LASER RESONATOR

FIELD OF THE INVENTION

This invention relates to laser systems and more particularly, to a method and apparatus for providing a nearly diffraction-limited beam for waveguide lasers or lasers utilizing thin slab-shaped laser media.

BACKGROUND OF THE INVENTION

High average power fluid media lasers operating at a high pulse repetition rate generally require that the active fluid laser medium be replaced between pulses, so that energy per pulse and beam quality do not degrade as a result of thermal energy deposited in the active medium by the pumping source. As the pulse repetition rate is increased, the volume of fluid which must be replaced per unit time is proportionally increased, so that for a given required output pulse energy from a fluid medium, a transverse flow is of great advantage. It has been found that fluid lasers such as dye lasers, may have the fluid confined in a rectangular cross section waveguide flow channel. The active region is thus in the configuration of a thin slab with rectangular cross section. The waveguide flow channel is of advantage in avoiding thermal gradients in the medium characteristic of other transverse flow lasers. This minimizes the effects of refractive index gradients in the medium across the thin dimension of the slab. See, for example, *Journal of Applied Physics*, Volume 11, pages 1 through 33 (1976), John J. Degnan and entitled "The Wave Guide Laser: A Review".

Although waveguide lasers have been used to advantage to avoid these thermal gradient problems, excessive vertical divergence occurs in the output beam because of the existence of discrete bands of radiation running horizonally across the exit faces of the waveguide, caused by internal, standing wave patterns. The presence of many of these thin horizontal bands results in a divergence far greater than the divergence characteristic of the whole slab vertical dimension. This in turn prevents waveguide lasers from every approaching diffraction-limited performance in the vertical dimension.

Obtaining diffraction-limited operation is important in laser isotope separation processes. One such process is described in U.S. Pat. Nos. 3,772,519; 3,939,354; 4,111,531; and 4,181,898. In the technique described in these patents, an environment containing a plurality of uranium isotopes is irradiated with laser radiation of a particular frequency to selectively excite the particles of the desired isotope type. When certain particles are selectively excited, the selectively excited particles may be separated as disclosed in these patents. For optimum radiation absorption efficiency, the laser isotope separation process utilizes long channels of vapor. This requires that all the radiation from the laser be completely coupled into the region at which the isotope separation is being accomplished and that none of the radiation be lost through divergence. It is particularly detrimental for the radiation to strike the channel walls of the isotope separation reaction zone. Beam collimation is thus critical to the process.

SUMMARY OF THE INVENTION

In order to provide an output beam nearly diffraction limited by the medium cross-section, a hybrid resonator is provided which includes a set of optical elements for coupling together lasing regions of a thin slap-shaped laser medium, in one embodiment fluid confined in a rectangular waveguide, through a set of reflectors defining a laser cavity. Positive cylindrical optics having axes parallel to the thick dimension of the waveguide, and therefore parallel to fluid flow through the waveguide, are provided at each end of the waveguide medium for focusing output radiation. These focusing lenses are utilized in combination with a negative cylindrical lens interposed in the laser cavity between one end mirror and the corresponding focusing lens. The negative lens is oriented so that its cylindrical axis lies in a plane perpendicular both to the optical axis of the slab and its thick dimension. The negative lens causes an unstable resonator condition to exist in a direction parallel to the thick dimension of the slab. This produces nearly diffraction limited beam quality in the vertical dimensions by coupling all portions of the medium together and avoiding the situation of lasing at discrete bands of light characteristic of waveguide operation. The action of the negative lens may thus be viewed as homogenizing the lasing within the active medium.

The unstable condition in the resonator is formed by virtue of the multiple transits of a laser through the laser medium as its traverses back and forth between the mirrors which define the ends of the laser cavity. With each transit, the negative lens deflects the beam so that it is reflected back through a portion of the laser medium further displaced from the central optical axis of the laser medium. In this manner, the transiting beams are "walked off" so as to homogenize the lasing within the medium and produce an output from the end of the laser waveguide having the desired bell shaped intensity distribution. The elimination of discrete bonds permits the diffraction performance of the laser system to be improved to that associated with the relatively large vertical aperture of the slab end. It should be noted that the cylindrical optics oriented parallel to the thick dimension deal with the thin typically horizontal dimension of the slab, whereas the negative lens oriented perpendicular to this direction deals with the thick typically vertical dimension of the slab to cause the walk off of the transiting beams with each roundtrip.

It will be appreciated that the negative lens, operative in a dimension perpendicular to both the thick dimension and the laser axis, yields a near field output of rectangular shape, with nearly diffraction-limited beam divergence.

The focusing lenses in the direction parallel to the thick dimension have focal lengths provided to couple the planar waveguide slab of the active laser medium to free space low order modes, enhancing beam quality in the direction transverse to the thick dimension. It should be noted that better system performance can be accomplished with the negative lens alone, although use with focusing lenses is desirable to couple only low order modes.

BRIEF DESCRIPTION OF THE DRAWINGS

The present invention is more fully described below in the detailed description of the preferred embodiment, and in the accompanying drawing of which.

DETAILED DESCRIPTION

Figure 1:
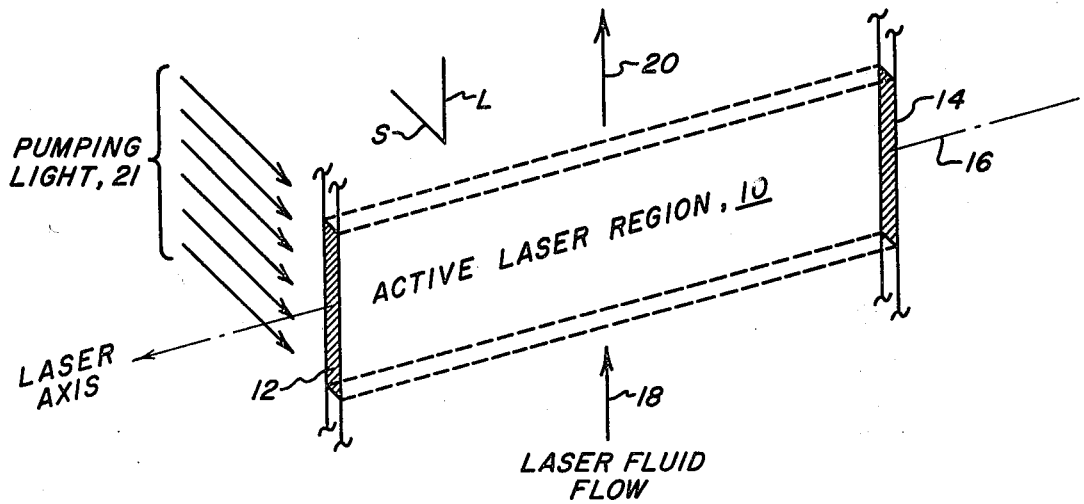
FIG. 1 is a diagrammatic representation of a thin slab type laser medium activated with pumping light in which the laser medium is provided by fluid flow through a rectangularly configured waveguide defining structure.

Referring to FIG. 1, an acitve laser region 10 is illustrated as having a slab-shaped configuration in which the ends 12 and 14 are generally rectangular in shape corresponding to the cross-section of the slab. The long or thick dimension direction of the cross-section is illustrated by axis L, whereas the thin or short dimension direction of the cross-section is designated by axis S. The active laser region is illustrated as having a central laser axis 16 with a laser fluid flow as illustrated by arrow 18 entering the region from the bottom and exiting the region from the top, parallel to axis L. This laser fluid, typically a lasable dye and solvent, is generally confined to the active laser region by a waveguide shaped retaining apparatus (not shown). While a fluid laser configuration is illustrated in this figure, it will be appreciated that the active laser region could be of a solid material as long as it has waveguide properties.

As illustrated, pumping light 21 propagates towards the active laser region 10 and excites the medium through the side or sides of the active laser region.

Figure 2:
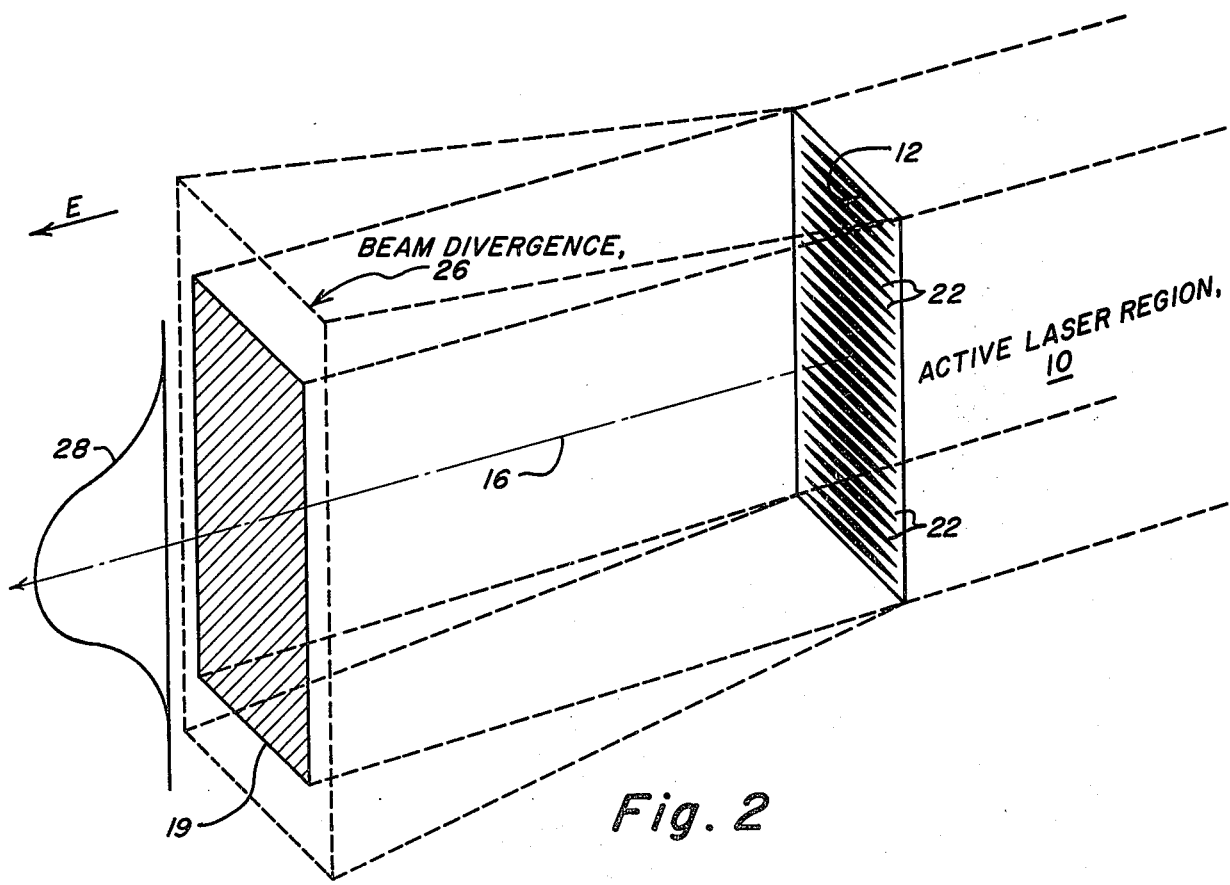
FIG. 2 is a diagrammatic illustration of the phenomena of beam divergence at the ends of a waveguide shaped active laser region also illustrating the desired near field image and energy distribution.

Referring now to FIG. 2, active laser region 10, if operated in the manner illustrated in FIG. 1, tends to lase such that bands 22 are formed at face 12. A bar of light emerges from face 12 at each band 22. It is the existence of these multiple bands which, because of their small apertures and large numbers produce a large vertical beam divergence as illustrated at 26. Such divergence is detrimental especially when the output beam is to be introduced into long vapor channels for isotope separation.

The desired near field image is illustrated by cross-sectional surface 19 which has a configuration and size nearly identical to that of the exit face of the waveguide as would be the case in a diffraction-limited output beam. As illustrated by curve 28 for the diffraction-limited system, the resulting vertical energy distribution is such that the energy in the beam is concentrated about central laser axis 16 and has a bell-shaped distribution curve.

Figure 3:
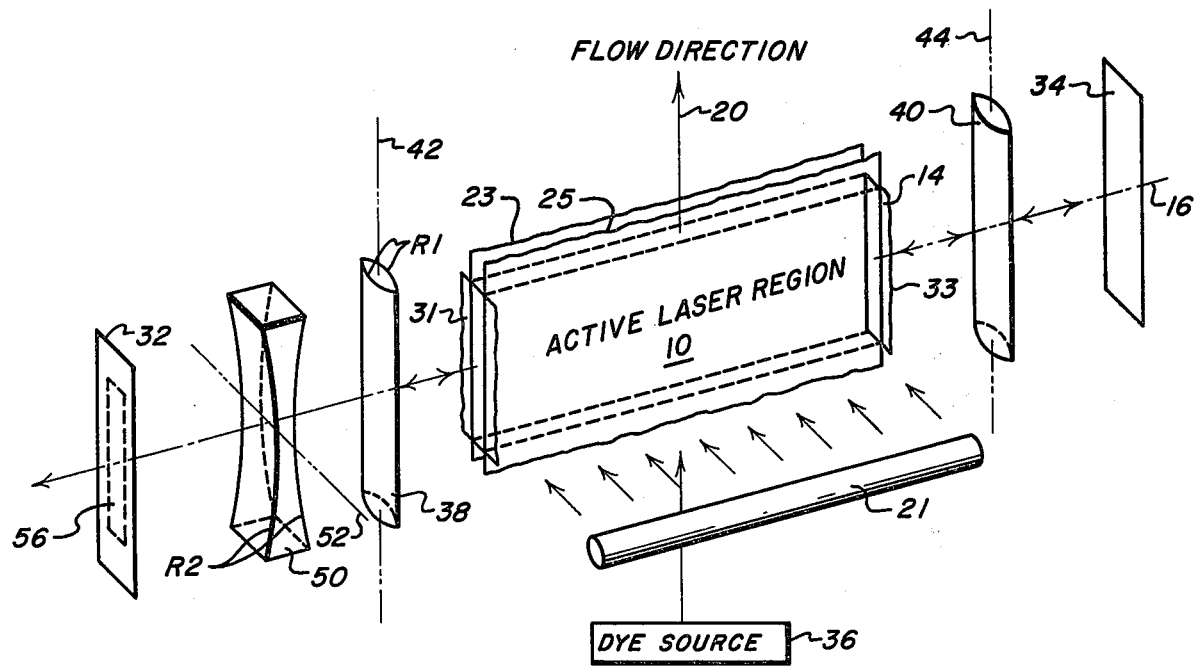
FIG. 3 is a schematic and block diagram illustrating one embodiment of the subject invention, including the utilization of positive cylindrical optics and a negative cylindrical lens; and, FIG. 4 is a diagrammatic illustration of the "walk off" of transiting beams, generated by a negative lens located within the laser cavity.

In order to eliminate the beam divergence illustrated in FIG. 2, and referring to FIG. 3, a laser system according to the present invention is illustrated. Active laser region 10 has a medium flowing therethrough along axis 20 between waveguide walls 23 and 25, typically 0.8 mm apart. A cavity is defined by mirrors 32 and 34 along central lasing axis 16 passing through region 10 and exit faces on windows 31 and 33. A dye source, diagrammatically illustrated at 36, is utilized to pump fluid though active laser region 10. The flow direction, as illustrated by arrow 20, flows parallel to the thick dimension of active laser region 10. Pumping light from a source 21 is illustrated as impinging upon a side of active laser region 10.

In order to select low order modes, cylindrical lenses 38 and 40 are interposed between the windows 31 and 33 of the active laser region 10 and mirrors 32 and 34, respectively. The longitudinal axes 42 and 44 of cylindrical lenses 38 and 40, that is to say the axes of symmetry of their cylindrically shaped surfaces, are arranged parallel to the flow direction, i.e., parallel to the thick dimension of active laser region 10.

As will be appreciated, the cylindrical lenses 38 and 40 are positive lenses with radii $R_1$ chosen to provide a focal length $f_1(+)$ for waveguide coupling.

A negative cylindrical lens 50 is positioned between the active laser region 10 and either of the mirrors 32 and 34 such that the axis of symmetry 52 of its cylindrically shaped surfaces is perpendicular to the flow direction, i.e., parallel to the thin cross-section dimension of the active laser region 10. It will be appreciated that lens 50 is a negative lens and is cylindrical in configuration, with radii $R_2$ chosen to produce a focal length $f_2(-)$ to form an unstable condition in the resonator, or laser cavity, in the direction parallel to the flow direction. The operation of the resonator to cause unstable lasing in the dimension parallel to the flow direction is discussed in connection with FIG. 4. However, before referring to FIG. 4, it should be noted that the near field cross section of the beam, here illustrated at 56 has a rectangular shape with nearly diffraction-limited beam divergence.

Determination of the lens parameters $R_1$, $R_2$, $f_1$, $f_2$, is within the skill of the art and may be derived in accordance with the teachings of the aforementioned article by John J. Degnan in the *Journal of Applied Physics*. Additional reference to Resonant Modes in a Mass Interferometer by A. G. Fox and Tinguye Li pp. 453–488, *The Bell System Technical Journal* March, 1961.

Figure 4:
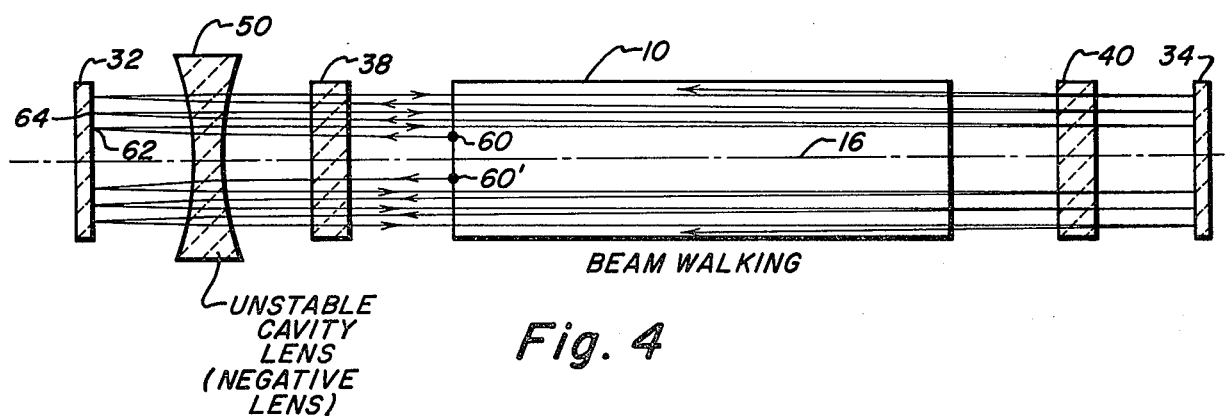

Referring now to FIG. 4 in which like elements carry like reference characters with respect to FIG. 3, it can be seen that negative lens 50 causes a beam, for instance emanating from a band 60, to diverge upwardly so that it impinges on mirror 32 at a point 62 above where it would have impinged had the negative lens not been interposed in the system. This beam is reflected back through the negative lens, back through active laser region 10 where it impinges on mirror 34, and is again reflected back through the active laser region. Thereafter, its direction is again altered by negative lens 50 so as to impinge at a point 64 on mirror 32. In this manner, the original beam is "walked off" the central laser axis in a direction which is parallel to the flow direction or parallel to the thick dimension of the active laser region 10. A similar effect in the opposite direction is achieved for radiate axis 16 such as radiation from band 60. This effectively couples all portions of the laser region 10 together providing a more homogeneous lasing operation without discrete bands 22.

With respect to the beam walking aspect of the subject invention, it will be appreciated that cylindrical lenses 38 and 40 do not materially effect the beam walking operation.

While the positive cylindrical lenses operate to select low order lasing modes, the negative cylindrical lens operates to walk off the beams as they transit back and forth between the end mirrors so as to provide the aforementioned homogeneity in the output of the active laser region 10. By so doing, a diffraction-limited system is produced which couples a maximum amount of energy out of the laser medium for useful work. Such a system may be efficaciously utilized wherever diffraction-limited performance is desired and most specifically in the aforementioned isotope separation process.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system of cavity components for use in a laser comprising:

an active laseable medium having an optical axis passing through said laseable medium;

said laseable medium having a thin dimension orthogonal to said optical axis and extending a predetermined distance along said optical axis;

said thin dimension being of a size to generally favor the propagation of waves therethrough whereby said medium acts as a waveguide;

means for reflecting laser radiation of said medium repeatedly through said medium; and a negative lens having foci lying along a line in the direction of said thin dimension, said lens being positioned between said reflecting means and said medium for diverting in said thick dimension beams travelling through said medium during each pass so that with each subsequent pass, each beam is displaced from its position in a previous pass for providing beam walking which results in optical coupling of separated portions of said medium together, whereby laser radiation from said medium has a divergence characteristic of the cross-sectional area of said medium transverse to said optical axis as opposed to a divergence characteristic of plural bands of radiation.

2. The system of claim 1 wherein said medium is a flowing dye solution.

3. The system of claim 2 wherein said dye solution flows in a direction transverse to both said optical axis and said thin dimension.

4. The system of claim 1 including excitation means for said medium.

5. The system of claim 1 wherein said thin dimension is less than 1 millimeter.

6. The system of claim 1 wherein said negative lens is a cylindrical lens.

7. The system of claim 6 further including at least one positive lens placed along the path of radiation between said mirrors through said medium.

8. The system of claim 7 wherein said at least one positive lens is a cylindrical lens having its axis of symmetry orthogonal to the axis of symmetry of said negative cylindrical lens.

9. The system of claim 8 wherein said optical axis is orthogonal to the axis of symmetry of said cylindrical positive and negative lenses.

10. The system of claim 8 wherein the axis of symmetry of said negative cylindrical lens is parallel to the thin dimension of said medium.

11. A method for reducing the beam divergence associated with a waveguide laser having an active slab-shaped laseable medium disposed in a cavity defined by a pair of end mirrors, comprising the step of directing laser cavity radiation through a negative lens elongated in the thin direction of said medium, said negative lens being located in the cavity between an end of the laseable medium and a corresponding end mirror, said negative lens producing an unstable resonator condition by diverting beams travelling through the medium during each pass so as to walk off each beam with multiple passes.

12. The method of claim 11 wherein said laseable medium is a dye.

13. The method of claim 12 further including the step of flowing the dye in a direction parallel to the thick dimension of the slab.

14. A method for limiting beam divergence in a waveguide laser having an active slab-shaped laser medium, comprising optically coupling separate regions of the slab-shaped laser medium by diverting beams travelling through the medium during each pass so as to walk off each beam with multiple passes so as to produce an unstable resonator condition, which eliminates bands of radiation from the ends of the laser medium characteristic of waveguide laser performance.

15. A method of improving the performance of a waveguide laser having reflective means at each end and an active slab-shaped laseable medium therebetween, comprising inserting a negative lens elongated in the thin direction of said medium between the medium and a reflective means for homogenizing the bands of radiation characteristic of waveguide laser performance from the ends of the laser medium into a bell-shaped intensity distribution.

16. Apparatus for reducing the beam divergence associated with a waveguide laser having an active slab-shaped laseable medium disposed in a cavity defined by a pair of end mirrors, comprising a negative lens elongated in the thin direction of said medium and interposed in said cavity between an end of said laseable medium and a corresponding one of said end mirrors for producing an unstable resonator condition which diverts beams travelling through the medium during each pass so as to walk off each beam with multiple passes.

* * * * *